United States Patent [19]

Miyatake

[11] Patent Number: 4,473,840
[45] Date of Patent: Sep. 25, 1984

[54] OPTICAL FOCUS ADJUSTMENT MEANS FOR PROJECTION TELEVISION APPARATUS

[75] Inventor: Yoshito Miyatake, Moriguchi, Japan

[73] Assignee: Matsushita Electric Industrial Co., Ltd., Osaka, Japan

[21] Appl. No.: 337,859

[22] Filed: Jan. 7, 1982

[30] Foreign Application Priority Data

Jan. 8, 1981 [JP] Japan .................................. 56-1718

[51] Int. Cl.³ ............................................. H04N 9/31
[52] U.S. Cl. .......................................... 358/60; 358/64
[58] Field of Search ..................... 358/60, 61, 64, 231, 358/237, 239

[56] References Cited

U.S. PATENT DOCUMENTS

| | | | |
|---|---|---|---|
| 2,590,240 | 3/1952 | Epstein | 358/60 |
| 2,642,487 | 6/1953 | Schroeder | 358/60 |
| 2,965,706 | 12/1960 | Ridgeway | 358/60 |
| 2,973,683 | 3/1961 | Rowe | 358/60 |
| 3,009,015 | 11/1961 | Bailey | 358/60 |
| 4,151,554 | 4/1979 | Tucker | 358/64 |
| 4,300,156 | 11/1981 | Boyd | 358/64 |
| 4,400,722 | 8/1983 | Miyatake | 358/60 |

*Primary Examiner*—Tommy P. Chin
*Attorney, Agent, or Firm*—Wenderoth, Lind & Ponack

[57] ABSTRACT

A projection television apparatus having three monochromatic cathode-ray tubes, a mirror block and a lens. The three cathode-ray tubes which display red, green and blue images, respectively are placed to form the letter "T" with their faceplates facing each other. The mirror block consists of two dichroic mirrors intersecting to form the letter "X". Red, green and blue images from the three cathode-ray tubes are combined into one color image by the mirror block, and the resulting color image is enlarged and projected on the screen by a single lens. It is possible for the mirror block to be moved linearly in one direction without rotation. The focus adjustment of the projected image on the screen may be carried out by moving both the mirror block and the lens without moving the cathode-ray tubes.

4 Claims, 8 Drawing Figures

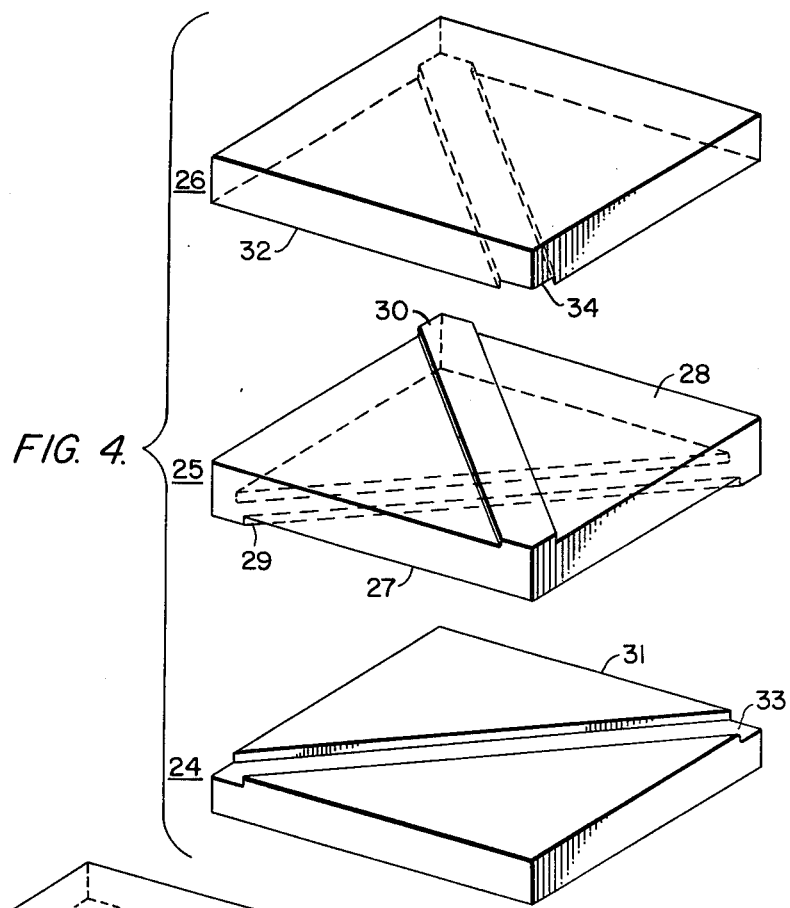
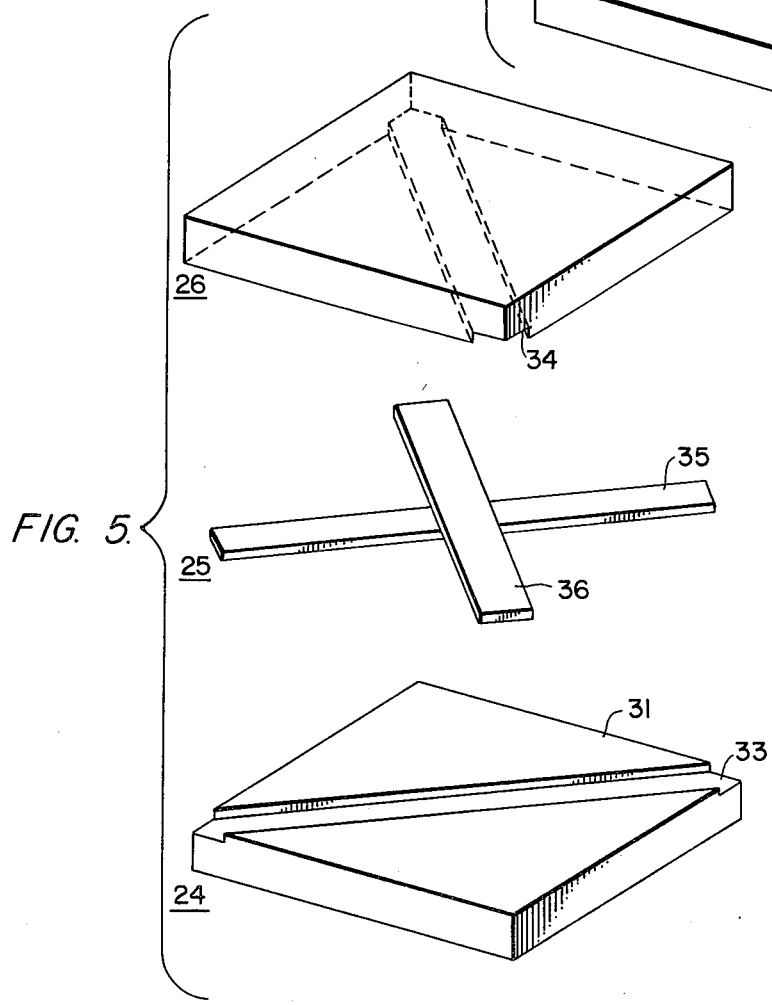
FIG. 4.
FIG. 5.

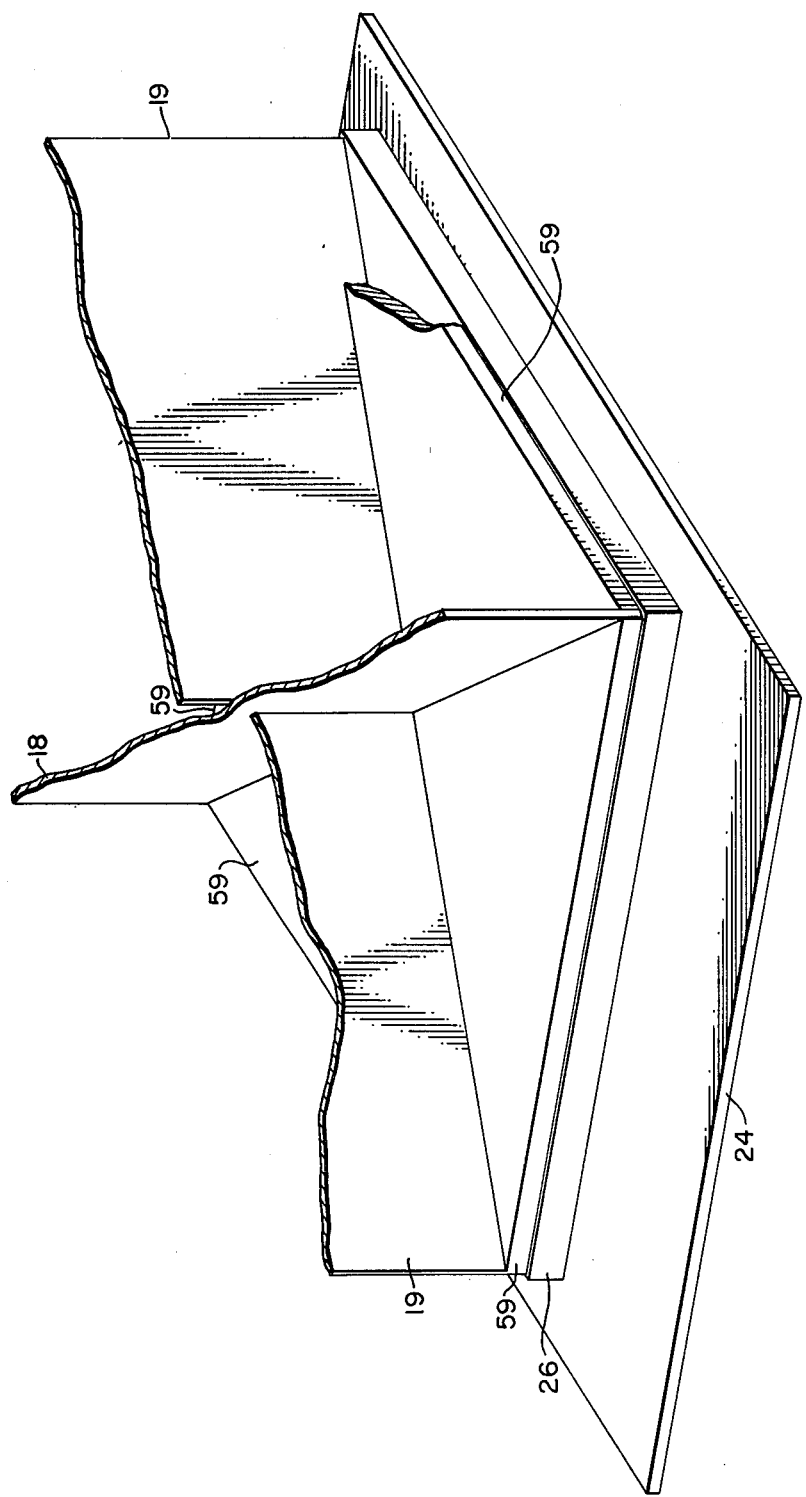

OPTICAL FOCUS ADJUSTMENT MEANS FOR PROJECTION TELEVISION APPARATUS

BACKGROUND OF THE INVENTION

The present invention relates to a projection television apparatus, and more particularly, to a focus adjusting means for such a projection television apparatus.

In order to provide a large picture, many types of projection television apparatuses have been proposed. A projection television apparatus that comprises three monochromatic cathode-ray tubes, two dichroic mirrors and a lens, has been been previously proposed, for example in U.S. Pat. No. 4,151,554.

Its basic construction will be described below:

Three cathode-ray tubes which display red, green and blue images, respectively are placed in the same plane to form the letter "T", with their faceplates facing each other and forming three sides of a parallelepiped space. Two dichroic mirrors are positioned in the space and are crossed at right angles to each other. The lens is placed on the axis of the center cathode-ray tube. Red, green and blue images from three cathode-ray tubes are combined into the color image by the two dichroic mirrors, and the resulting color image is enlarged and projected onto the screen by a single lens.

It is necessary for the projected image of each color to be adjusted individually for focus ("focus" described here is not the focus of the electron gun beam in the cathode-ray tube but that of the projecting lens exclusively). The customary way is by sliding the lens along its optical axis in order to focus roughly, and sliding each cathode-ray tube along its optical axis in order to focus each color finely. In this case a mechanism for focus adjustment is necessary so that each cathode-ray tube can be moved along its optical axis when focus adjustment is carried out, and can be fixed after focussing is finished. But such a mechanism becomes a very large-scale device because cathode-ray tubes are heavy and big. This mechanism, additionally, has the problem that persons using it are in danger of receiving an electric shock, because the focus adjustment is carried out while the cathode-ray tubes are driven at a high voltage (about 30 kV in general).

BRIEF SUMMARY OF THE INVENTION

It is an object of the present invention to provide a projection television apparatus having a focus adjustment means by which focus adjustment is carried out easily and safely, and the mechanism of which is simple.

The present invention provides a projection television apparatus comprising: three monochromatic cathode-ray tubes which display red, green and blue images, respectively and which are placed to form the letter "T" with their face-plates facing each other; a lens placed on the optical axis of the center cathode-ray tube of said three cathode-ray tubes; and a mirror block which consists of two dichroic mirrors intersecting to form the letter "X", and which is placed in the space formed by said faceplates for reflecting different colors along said optical axis to said lens, characterized in that said mirror block can move linearly in one direction so as to adjust only the focus of the projected images of the respective color.

Features and advantages of the present invention will appear more fully hereinafter from a consideration of the following description of an embodiment thereof in connection with the accompanying drawings in which:

BRIEF DESCRIPTION OF THE DRAWINGS

FIG. 4 is an a perspective exploded view of one embodiment of the focus adjustment means;

FIG. 5 is a perspective exploded view of another embodiment of the focus adjustment means;

FIG. 7 is a partial cutaway perspective view of the mirror block.

DETAILED DESCRIPTION OF THE PREFERRED EMBODIMENTS

Figure 1:
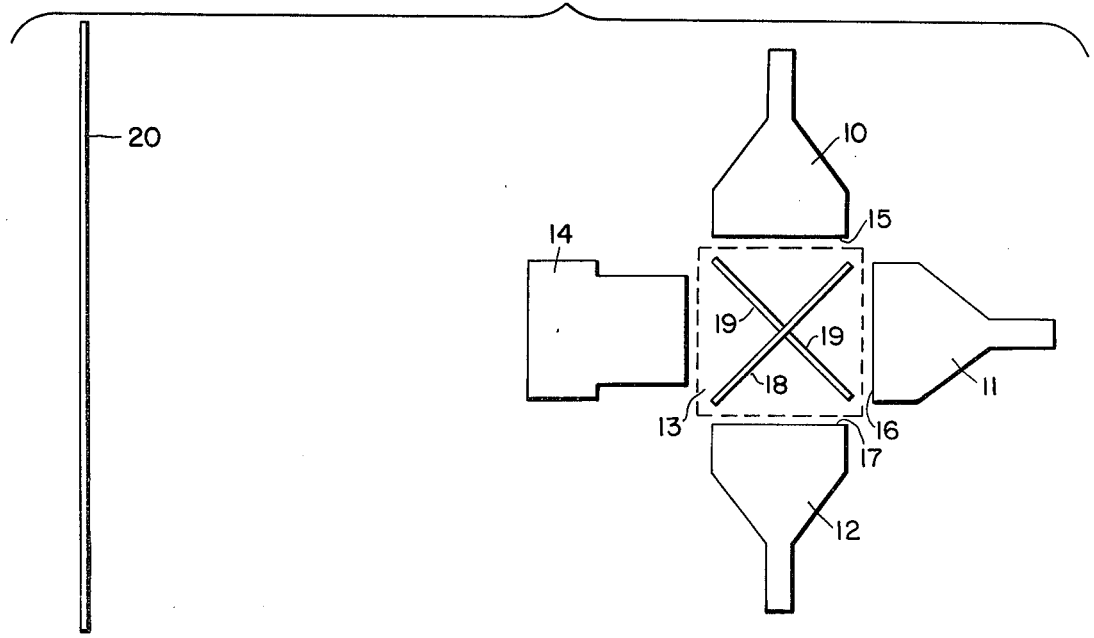
FIG. 1 is a schematic plan view of the main portion of a projection television apparatus in accordance with the present invention.
Figure 2:
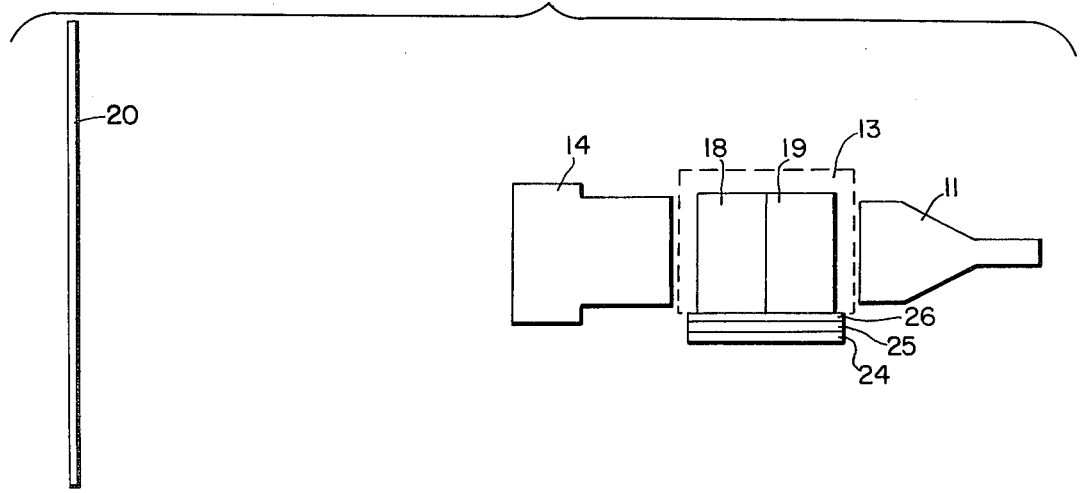
FIG. 2 is a schematic side view thereof, parts being broken away.

FIG. 1 and FIG. 2 show the main portions of a projection television apparatus according to the present invention. FIG. 2 has some parts removed for clearness. As shown, the main portion comprises three monochromatic cathode-ray tubes 10, 11 and 12, a mirror block 13 and a lens 14. The three cathode-ray tubes 10, 11 and 12 display red, green and blue images, respectively. The red cathode-ray tube 10 and the blue cathode-ray tube 12 are placed in the same plane and on either side of the green cathode-ray tube 11 to form the letter "T", with their faceplates 15, 16 and 17 close to each other and roughly facing each other and forming three sides of a parallelepiped space. The mirror block 13 consists of two dichroic mirrors 18 and 19, intersecting at right angles to each other to form the letter "X". One dichroic mirror 18 is a red-type dichroic mirror which reflects red light but transmits green and blue light. Another dichroic mirror 19 is a blue-type dichroic mirror that reflects blue light but transmits red and green light. The mirror block 13 is placed in the parallelepiped space. The lens 14 is placed on the axis of the green cathode-ray tube 11 and constitutes the fourth side of the parallelepiped space enclosing the mirror block 13. Every angle between any normal to any dichroic minor surface and the optical axis of any cathode-ray tube is 45°. Employing such apparatus as shown in FIG. 1 and FIG. 2, the red, green and blue images from three cathode-ray tubes 10, 11 and 12 are combined into the color image by the dichroic mirrors 18 and 19, and the resulting color image is enlarged and projected onto a screen 20 by the lens 14.

Figure 3A:
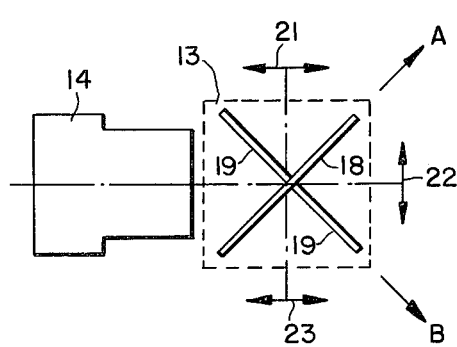
FIGS. 3a and 3b are schematic diagrams for use in explaining the operation of the present invention.
Figure 3B:
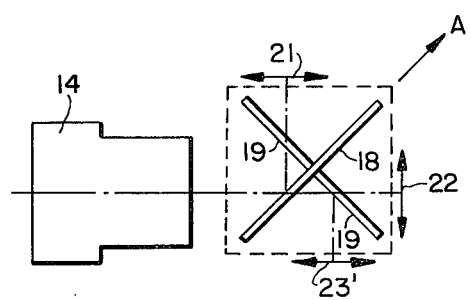

The principle of the focus adjustment means according to the present invention will be described below. FIG. 3a shows the standard position of the mirror block 13 associated with the lens 14, and the optimum image positions 21, 22 and 23 (designated by arrows) of the cathode-ray tubes 10, 11 and 12, respectively. The optimum image position is defined as the position of the fluorescent surface on which the image appears, which position is such that the projected image of each color is in best focus and superimposed on the other color images on the screen 20. The optimum image position depends on the relationship between the screen 20, the lens 14 and the mirror block 13. As the mirror block 13 moves relative to the lens 14, the optimum image position of each color relative to the lens 14 is moved. The center of the green optimum image is placed on the optical axis of the green tube 11. The centers of the red and blue optimum images are placed on straight lines which are parallel to the optical axis of the red and blue tubes 10 and 12, respectively, and which are from the point where the axis of the green tube 11 intersects the reflective surface of the respective mirrors. The optical distance on the optical axis between the lens 14 and each optimum image position is held constant. Regarding the projected image of each color on the screen 20 as an object, the optimum image positions 21, 22 and 23 can be regarded as the positions where real images of associated objects are focused. Where either one or both of the fluorescent surfaces of the red and blue tubes is not in the optimum image position, one or both of the red and blue images is not in proper focus. FIG. 3b shows the mirror block 13 having been moved in a direction A along the plane of the red-type dichroic mirror 18 to adjust for the image from the screen of the blue tube 12 which is out of position compared to the position of the screen of the blue tube in FIG. 3a, in this case the screen and thus the image being in focus closer to the mirror block as shown in dotted lines in FIGS. 3a and 3b. The green optimum image position 22 doesn't move, irrespective of the displacement of the mirror block 13, because green light proceeds straight through both dichroic mirrors 18 and 19. The red optimum image position 21 doesn't move either, because the reflective surface of the red-type dichroic mirror 18 doesn't move relative to the lens 14 during such displacement of the mirror block 13. But the blue optimum image position is moved to 23', because the reflective surface of the blue-type dichroic mirror 19 is moved away from the lens 14 during the displacement of the mirror block 13 until the blue image reflected from mirror 19 is in focus, at which point the center of the image optical axis must be shifted by shifting the image on the screen of the blue to a position where it intersects mirror 19 where the optical axis of the green tube passed through it. The amount of displacement of the blue optimum image position is twice the distance of displacement of the mirror block 13. And the direction of displacement of the blue optimum image position 23 is in the same sense as the direction of displacement of the mirror block 13. Therefore, when the mirror block 13 is moved in the direction A, the blue optimum image position 23 is changed without changing the red and green optimum image positions 21 and 22. This shows that the focus of the blue projected image alone may be adjusted by changing the position of the mirror block 13 instead of changing the position of the blue cathode-ray tube 12. The focus of the red projected image alone may be adjusted by changing the position of the mirror block 13 only in the direction B as shown in FIG. 3a. The focus of the green projected image is adjustable by moving the lens 14 along its optical axis. The green focus adjustment should be carried out before the red and blue focus adjustments.

When the focus adjustments of the red and blue projected images are thus carried out because the optimum image positions are changed but the real images do not shift, the images projected onto the screen 20 are shifted sidewards, and their sizes change. However, these problems are solved easily by adjusting positions and sizes of the images displayed on the cathode-ray tubes 10, 11 and 12 by adjusting deflection circuits. In general, the faceplate of a cathode-ray tube for use in projection television apparatuses is a flat plane or a shape like a flat plane. Hence the focus of the projected image is scarcely changed all over the screen 20, even if the image on the cathode-ray tube is shifted sidewards on it. But it is necessary for the mirror block 13 to be moved without rotation, because otherwise it becomes impossible to adjust the focus of the peripheral area of the projected image on the screen 20.

The sequence of focus adjustment according to the present invention will be described below.

(I) Slide the lens 14 along its optical axis so that the green projected image on the screen 20 is in best focus.

(II) Move the mirror block 13 along the plane of the red-type dichroic mirror 18 so that the blue projected image on the screen 20 is in best focus.

(III) Move the mirror block 13 along the plane of the blue-type dichroic mirror 19 so that the red projected image on the screen 20 is in best focus.

(IV) Adjust the positions and the sizes of the images on the cathode-ray tubes 10, 11 and 12 so that the images of respective colors are superimposed on each other on the screen 20.

FIG. 4 shows one embodiment of a mechanism which enables the parallel displacement of the mirror block 13. This figure is an exploded view from a perspective under the mirror block 13 as shown in FIG. 2. The bottom board 24 and three cathode-ray tubes 10, 11 and 12 are fixed to one another. The middle board 25 is placed on the bottom board 24, and the upper board 26 is placed on the middle board 25. These three boards 24, 25 and 26 are shaped like regular squares, and placed so that three sides of each board are adjacent and parallel to the faceplates 15, 16 and 17, respectively. The mirror block 13 is fixed on the upper board 26. Both the underside surface 27 and the topside surface 28 of the middle board 25 have straight protuberances 29 and 30 along opposite diagonal lines. The topside surface 31 of the bottom board 24 and the underside surface 32 of the upper board 26 have corresponding straight grooves 33 and 34. The protuberance 29 fits in the groove 33 and hence the middle board 25 can move parallel in only one direction relative to the bottom board 24. The protuberance 30 fits in the groove 34 and hence the upper board 26 can move parallel in only one direction relative to the middle board 25. Moreover the upper board 26 can move parallel only in the other direction relative to the bottom board 24 without rotation. The middle board 25 and the upper board 26 are moved when the focus adjustment is carried out, and the three boards 24, 25 and 26 can be fixed to each other, for example by screws after the adjustment is finished. As the protuberance 29 and the groove 33 are parallel to the blue-type dichroic mirror 19, moving the mirror block 13 with the upper board 26 the middle board 25 fixed together enables the focus adjustment of the red projected image. And also, as both the protuberance 30 and the groove 34 are parallel to the red-type dichroic mirror 18, moving the mirror block 13 with the middle board 25 fixed to the bottom board 24 enables focus adjustment of the blue projected image. In the example shown in FIG. 4, substituting the groove for the protuberance and the protuberance for the groove on each pair of boards provides the same function.

FIG. 5 shows another embodiment according to the present invention. The construction in FIG. 5 is similar to that in FIG. 4 except for the middle board. The middle board 25 consists of two boards 35 and 36 which are fixed to each other so as to intersect at right angles. The middle board 25 fits in both the groove 33 of the bottom board 24 and the groove 34 of the upper board 26. Therefore the upper board 26 can move parallel to the bottom board 24 without rotation, and in the same direction as in the preceding embodiment.

Figure 6:
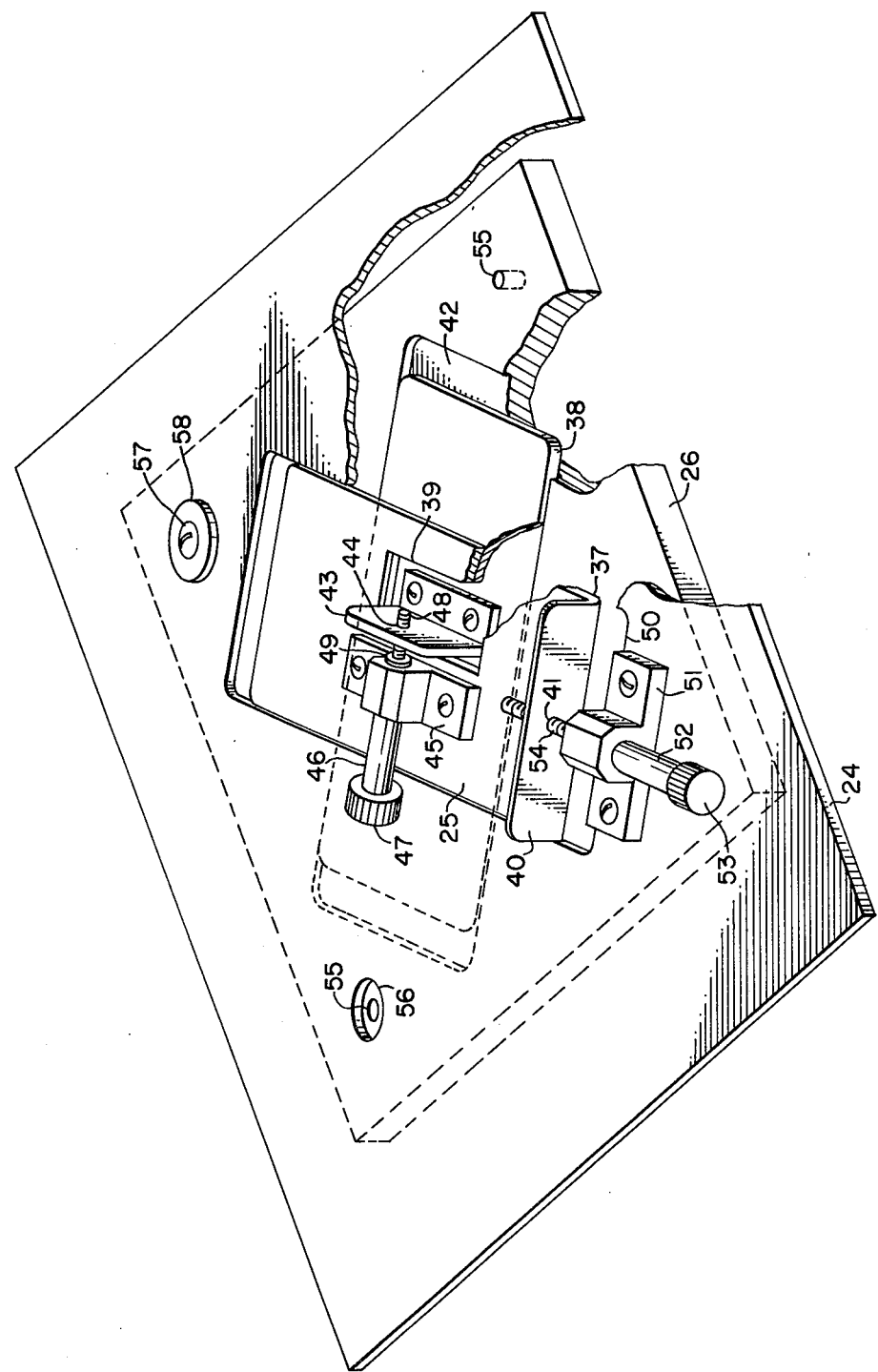
FIG. 6 is a partial cutaway perspective view of the bottom of the focus adjustment means in a more general form embodying the present invention.

FIG. 6 shows a specific practical embodiment according to the present invention in a more general form. This figure is a partial cutaway view in perspective of the focus adjustment means turned upside down.

The middle board 25 consists of the first plate 37 and the second plate 38, both of which are rectangular metal plates and fixed to intersect at right angles, and the connected plates have an aperture 39 therethrough. The edge 40 of the first plate 37 is bent at a right angle to the remainder of plate 37 and has a female threaded hole 41 thereon. The upper board 26 is made of plastic and has a rectangular hollow 42 therein, the depth of which is slightly greater than the thickness of the second plate 38. The second plate 38 fits in the hollow 42 and can slide therealong. A small metal plate 43 bent to form the letter "L" and having a female threaded hole 44 therein, is fixed on the upper board 25 and extends through the aperture 39 of the middle board 25. A bearing 45 is fixed on the middle board 25. A shaft 46, which has a knob 47 at one end and a thread 48 at the other end, extends through the bearing 45. An E-ring 49 is mounted on the shaft 46 so that the shaft 46 can slide only slightly back and forth. The thread 48 is threaded through the hole 44. Rotating the knob 47 causes the upper board 26 to slide along the second plate 38. The lower board 24 is a metal plate and has an aperture 50 in which the first plate 37 fits and can slide. A bearing 51 is fixed on the lower boards 24. A shaft 52, which has a knob 53 at one end and a thread 54 at the other end, extends through the bearing 51. An E-ring which has the same shape as the E-ring 49 is put on the shaft 52 so that the shaft 52 can slide only slightly back and forth. The thread 54 is threaded through the hole 41. Rotating the knob 53 causes the first plate 37 to slide along the aperture 50. By the mechanism described above rotating the knobs 47 and 53 causes the upper board 25 to slide without rotation relative to the lower board 24. Rotating one of the two knobs 47 and 53 causes the upper board 25 to slide in a direction along one of the two diagonal lines of the square of the upper board 25. The upper board 25 has female threaded hole 55, and the lower board 24 has holes 56 the diameters of which are larger than the diameter of the female threaded hole 55 and each of which is over the female threaded hole 55. A screw 57 is passed through washer 58 and into the female threaded hole 55. The focus adjustment is carried out with the screw 57 loosened. After its adjustment the screw 57 is tightened and hence the upper board 26 is fixed to the lower board 24.

FIG. 7 shows the construction of the mirror block 13. Four triangular plates 59 which are equilateral right triangles are placed on the upper board 26 with gaps therebetween. The red-type dichroic mirror 18 and the blue-type dichroic mirror 19 are placed on the upper board 26, with the edges held in the gaps between the triangular plates 59 with a binding agent. The blue-type dichroic mirror 19 is split in two. The red-type dichroic mirror 18 and the blue-type dichroic mirror 19 are along each diagonal line of the square of the upper board 26, respectively. The cathode-ray tubes 10, 11 and 12 are fixed on the lower board 24.

As described above, the present invention provides a projection television apparatus having a focus adjustment means by which focus adjustment is carried out easily and safely, and which mechanism is simple.

What is claimed is:

1. A projection television apparatus comprising:
   three fixed position cathode-ray tubes of red, green and blue, respectively, placed in a T-shaped array with the red and blue tubes along a common axis perpendicular to and in the same plane as the axis of the green tube which lies between them, said tubes having their faceplates close to each other and substantially facing each other and defining a parallelepiped space therebetween;
   a mirror block constituted by a red-type dichroic mirror and a blue-type dichroic mirror reflecting exclusively red light and blue light, respectively, and intersecting at right angles and positioned in the parallelepiped space;
   an enlarging and projecting lens on the optical axis of said green cathode-ray tube and being substantially at the fourth side of said space; and
   means for moving said mirror block within said space for moving said mirrors to bring each of the respective red and blue images into optimum focus while leaving the focus of the other image unchanged.

2. A projection television apparatus as claimed in claim 1 wherein said means for moving said mirror block comprises means for moving it only in directions parallel with the reflecting surfaces of said dichroic mirrors.

3. A projection television apparatus as claimed in claim 2 wherein said moving means is a bottom board positioned at the bottom of said parallelepiped space between said face plates, a middle board movably mounted on said bottom board, and an upper board movably mounted on said middle board, said mirror block being fixed on said upper board, said bottom board and said middle board having on their abutting surfaces a first protuberance and a first mating groove in which said first protuberance is slidable and extending in a direction for guiding said mirror block in movement in a direction parallel to the surface of one of said dichroic mirrors, said middle and said upper board having on their abutting surfaces a second protuberance and a second mating groove in which said second protuberance is slidable and extending in a direction for guiding said mirror block in movement parallel to the surface of the other of said dichroic mirrors.

4. A projection television apparatus as claimed in claim 2 wherein said moving means comprises a bottom board placed at the bottom of said parallelepiped space, an upper board above said bottom board and on which said mirror block is fixed, and two elongated boards connected in the form of the letter X between said bottom board and said upper board, said bottom board and said upper board having grooves in the opposed faces in which said elongated boards are slidably fitted for guiding said mirror block in movement in directions parallel to the surfaces of the respective dichroic mirrors.

* * * * *